United States Patent [19]

Coll-Palagos

[11] 4,204,925

[45] May 27, 1980

[54] RECOVERY OF PHOSPHORUS FROM SLUDGE

[75] Inventor: Miguel Coll-Palagos, Rye, N.Y.

[73] Assignee: Stauffer Chemical Company, Westport, Conn.

[21] Appl. No.: 786,728

[22] Filed: Apr. 11, 1977

[51] Int. Cl.$^2$ .............................................. C25B 1/00
[52] U.S. Cl. .................................. 204/152; 204/128; 204/130; 204/149
[58] Field of Search ............... 204/128, 130, 149, 151, 204/152; 423/322, 323

[56] References Cited

U.S. PATENT DOCUMENTS

| 744,171 | 11/1903 | Davis et al. | 204/152 |
|---|---|---|---|
| 3,113,839 | 12/1963 | Barber et al. | 423/323 |
| 3,442,621 | 5/1969 | Hinkebein | 423/322 |
| 3,830,039 | 8/1974 | Ebert et al. | 423/322 |
| 3,933,606 | 1/1976 | Harms | 204/152 |
| 4,053,378 | 10/1977 | Moeglich et al. | 204/152 |

OTHER PUBLICATIONS

"Electrical Props of Colloidal Dispersions," Gen. Chem. by H. H. Sisler et al., 1949, pp. 385–386.
Encyclopedia of Chem. Technology by Kirk–Othmer, 2nd ed., vol. 8, 1966, p. 152.
Inorganic Chem. by P. C. L. Thorne et al., 6th ed., 1958, p. 112.

Primary Examiner—R. L. Andrews
Attorney, Agent, or Firm—Roger S. Benjamin

[57] ABSTRACT

A process for recovering elemental phosphorus from sludge formed during the production of phosphorus by the smelting of phosphate rock which comprises subjecting the phosphate sludge to electrolysis, thereby facilitating removal of the elemental phosphorus from the sludge.

22 Claims, 1 Drawing Figure

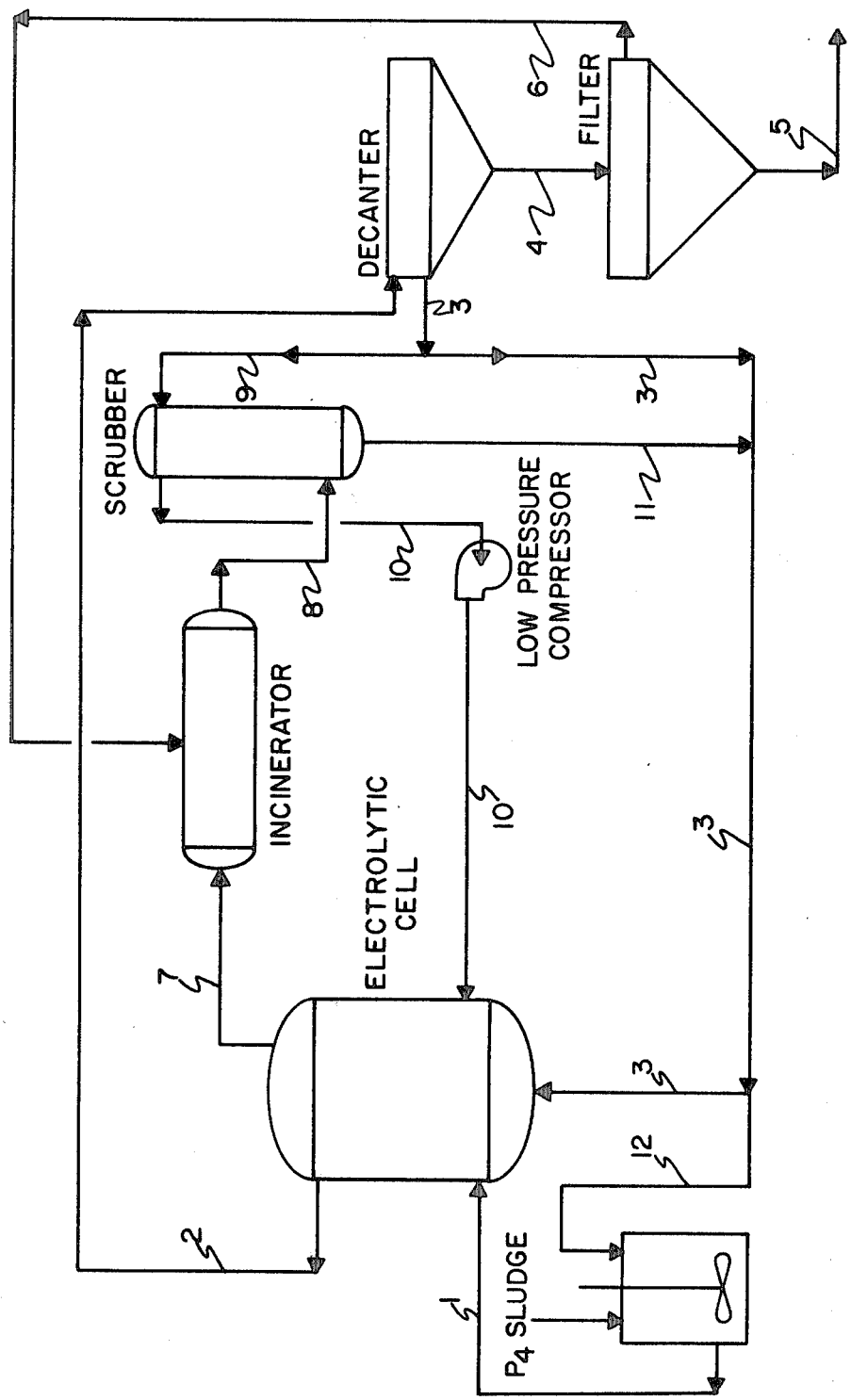

RECOVERY OF PHOSPHORUS FROM SLUDGE

BACKGROUND OF THE INVENTION

The present invention relates to an improved process for recovering elemental phosphorus from sludge, and more particularly from the sludge formed during the production of elemental phosphorus by the smelting of phosphate rock.

The basic method for producing elemental phosphorus is accomplished by the reduction of phosphate rock with coke or other carbonaceous reducing agents in the presence of silica. This is referred to as the furnace "charge" or "burden." The phosphorus production is generally carried out in an electric furnace at a reaction temperature of about 1,400°–1,500° C.

The mechanism of the reduction of phosphate rock to elemental phosphorus is quite complex and the exact path of the reaction sequence has not been conclusively defined. The overall reaction is generally represented by the following simplified equation:

$$Ca_3(PO_4)_2 + 3SiO_2 + 5C \rightarrow 3CaSiO_3 + 5CO + P_2$$

During the course of the reaction, the phosphorus produced vaporizes, rises, and is cooled, condensed, and collected under water. The phosphorus vapor is generally accompanied by carbon monoxide and appreciable quantities of entrained dust comprising phosphate burden, $K_2O$, fluorine, lime, slag particles and the like. The dust-vapor mixture can be passed through a Cottrell electrostatic precipitator where most of the dust is removed prior to cooling the phosphorus vapor. The CO gas can be recovered for use as fuel or properly disposed of in accordance with pollution requirements. Solid furnace residue comprising calcium silicate is drawn off from the bottom of the furnace as a molten liquid. Iron phosphide or "ferrophosphorus" formed from the iron impurities present in the phosphate ore is also drawn off as a melt from the bottom of the furnace.

The condenser drains into a sump wherein the phosphorus product is collected. Three separate layers generally form in the condenser sump.

A layer of relatively high grade phosphorus is obtained at the bottom. The intermediate layer is a mixture referred to as "sludge," which consists of phosphorus droplets or globules, solid impurities, and water. Above the sludge layer is a water layer. The boundary between the sludge layer and water layer is not clearly defined.

The amount of phosphorus sludge ($P_4$-sludge) produced will vary, depending upon factors such as the initial composition of phosphate rock charged, the operating conditions and design of the furnace. Phosphorus sludge can contain from about 5% to about 90% by weight elemental phosphorus. The phosphorus sludge produced can vary from about 10 to about 60 weight percent or more, of the furnace output of elemental phosphorus.

The elemental phosphorus can be recovered from the sludge by roasting. This operation is becoming more expensive due to rising energy costs. It is also hazardous due to pressures generated inside the roaster. In addition, roasting leads to high $P_2O_5$ emissions, a pollution problem. Other methods for treating the sludge include burning it and making low grade phosphoric acid.

The sludge, as the term is used in the art and herein, appears to be a poorly defined emulsion containing solid impurities, water and phosphorus in widely varying proportions and having a density between the density of phosphorus and the density of water. The sludge can have the characteristics of a "phosphorus in water" type emulsion, that is, the phosphorus being the discontinuous phase and the water being the continuous phase, or a "water in phosphorus" type emulsion, that is, the water being the discontinuous phase and the phosphorus being the continuous phase. Microscopic examination of the phosphorus in water type sludge shows that the phosphorus is present in small globular particles which will not coalesce. The size of the particles is generally in the range of micron to millimeter, and larger dimensions.

Various methods for recovering elemental phosphorus from sludge have been suggested in the prior art. Among these are physical methods for separating the phosphorus, such as filtration, distillation, stirring and settling, vibration, centrifuging, briquetting and the like. There have also been chemical innovations for recovering phosphorus from sludge in the patent literature. For example, U.S. Pat. No. 3,084,029 discloses that when small amounts of dispersing agents are introduced into the sludge and the pH of the sludge adjusted to about 6 the viscosity and stickiness is reduced. U.S. Pat. No. 3,104,952 admixes the sludge with phosphoric acid and steam distills the mixture in a non-oxidizing atmosphere.

U.S. Pat. No. 3,436,184 uses an oxidizing agent to decrease the phosphorus content of the sludge. U.S. Pat. No. 3,442,621 treats the sludge with chromic acid and coalesces the phosphorus in the sludge in the presence of an acidulating agent in order to decrease the phosphorus content of the sludge. U.S. Pat. No. 3,615,218 recovers the phosphorus values from the sludge by admixing the sludge with carbon disulfide.

The present invention has achieved the recovery of elemental phosphorus from sludge by subjecting the sludge to electrolysis, thereby enabling the facile separation and recovery of elemental phosphorus.

DESCRIPTION OF THE PREFERRED EMBODIMENT

In accordance with the present invention, elemental phosphorus is recovered from phosphorus sludge by electrolyzing the sludge, and then separating the phosphorus from the sludge, usually by means of filtration at low pressures.

The actual reactions involved in the electrolysis of the phosphorus sludge, other than the electrolysis of water to hydrogen and oxygen, are not understood. Accordingly, a simplified equation of the process is:

$$P_4 \cdot X + 2H_2O \xrightarrow[\text{DC Current}]{\text{electrolyte}} P_4 \ldots \ldots X + 2H_2 + O_2$$

where $P_4 \cdot X$ is the sludge containing elemental phosphorus, and $P_4 \ldots \ldots X$ is the product of the electrolysis. The $P_4 \ldots \ldots X$ is filterable at relatively low pressures.

The electrochemical or electrolysis cells capable of performing the breakdown of the phosphorus sludge so that the elemental phosphorus can be separated, can be horizontal, vertical, or cylindrical in configuration, and can be operated with or without a diaphragm. This equipment is conventional and well known in the art.

The electrodes used in the electrolysis cell are also conventional and well known in the art. In the case of the anodes, they can be soluble or insoluble. The cathodes are insoluble.

Preferred anodes are known in the art as "DSA" or "dimensionally stable anodes." These anodes are constructed of expanded titanium sheet covered by or coated with noble metal oxides, such as platinum, rhodium and the like. Cathodes can be of a similar material for ease of construction.

A preferred electrode configuration employs a multiplicity of electrodes in an electrode pack wherein anode and cathode alternate in series. The electrodes can also be rotatable to provide a mixing or agitation of the sludge during the electrolysis. Another suitable electrode arrangement can be wherein the walls of the cell comprise the cathode and wherein the anode or anodes are disposed within the cell.

The electrode spacing can vary and is a function of the nature of the sludge, electrolyte conductivity and materials of construction of the electrolysis environment. Typical electrode spacing can vary from about $\frac{1}{8}''$ up to about 2", preferably from about $\frac{1}{2}''$ to about 1", and in some instances even greater than 2".

It is not fully understood how the electrolysis of the phosphorus sludge facilitates the separation of the elemental phosphorus. It has been found that as a result of the electrolysis treatment of the sludge, the elemental phorphorus contained therein becomes more readily filterable and loses its tendency to plug the filter media. As stated previously, the phosphorus sludge appears to have the characteristics of an emulsion which retains or encapsulates fine particles of elemental phosphorus that do not coalesce. It is believed that the electrolysis of the phosphorous sludge accelerates the "breaking" of the emulsion which enables the fine particles of elemental phosphorus to free themselves from the sludge, coalesce and enlarge so that they can be more easily separated. By allowing the electrolytically treated sludge to settle, the coalesced phosphorus particles, due to their greater density, will settle out over a period of time and can be recovered. A more efficient means for separating the elemental phosphorus from the electrolytically treated sludge is by filtration, centrifugation, and the like.

A typical phosphorus sludge composition appears below:

| TYPICAL COMPOSITION OF PHOSPHORUS SLUDGE | |
| --- | --- |
| Component | Percent by Weight |
| Phosphorus | 15–60 |
| Water | 50–75 |
| Solids* | 10–75 |

*Solids consist of nodule fines, particles of coke, $SiF_2$, $Na_2SiF_6$, $K_2SiF_6$ and $CaSiF_6$.

Current and voltage relationships for the electrolysis depend upon the electrolyte composition and concentration, temperature, the electrode spacing, and the electrode material of construction. One skilled in the art can readily determine the necessary parameters for a particular phosphorus sludge composition.

The phosphorus sludge can be subjected to the electrolysis directly without the presence of an electrolyte(s) if the amount and concentration of phosphoric acid or other electrically conducting salt in the sludge is sufficient to provide adequate electrical conductivity during the electrolysis, i.e. the largest current flow obtained at the lowest applied voltage.

Naturally, a sludge that provides no current flow between the electrodes when voltage is applied, will require an electrolyte. The amount of electrolyte necessary can be determined by a plot of concentration of electrolyte added versus current flow. In most instances the preferred electrolyte concentration is not necessarily that concentration which will produce the maximum current. It is more preferably a balancing consideration of that concentration of electrolyte which will enable the electrolysis to proceed in an efficient manner at the lowest possible voltage. Cost factors are an important consideration.

It is contemplated that most efficient electrolysis can be conducted at voltages below 10 volts. Higher voltages can be used, however, this would not be an economically preferably expedient in view of the more preferable options of changing the electrolyte concentration or increasing the electrolyte temperature by external heating, to achieve the same end.

Direct current (DC) is preferable to alternating current (AC) in conducting the $P_4$-sludge electrolysis. D.C. voltages have enabled shorter recovery times for separating the elemental phosphorus from the sludge. A.C. is substantially less efficient, however, increasing the voltage may improve the efficiency.

For efficient electrolysis, the sludge should be in moving contact with the electrodes. Thus, mechanically agitating the electrolyte and/or sludge mixture, such as with moving electrodes, or by fluidizing the sludge is recommended.

When it has been determined that an electrolyte should be used in conjunction with the sludge, the concentration and amount of electrolyte can vary so long as the sludge contacts the electrodes for an efficient electrolysis. Keeping in mind the above noted criteria for using an electrolyte, the ratio of electrolyte to sludge, preferably, can vary from about 10:1 to about any maximum on a weight basis. Ratios of 1:1 or less can also be used under fluidized electrolysis conditions. The electrolyte also provides the added benefit of improving the flowability of the phosphorus sludge to facilitate its movement and handling.

In those instances where it is determined that an electrolyte will improve the current flow through the electrolytic cell, a wide choice of suitable electrolytes are available. Both inorganic or organic electrolytes are suitable as long as their presence does not adversely affect the electrolysis of the phosphorus sludge. Thus, inorganic mineral acids such as hydrochloric, sulfuric, nitric and phosphoric are suitable. Based such as alkali or alkaline earth hydroxides and inorganic salts such as halides, sulfates, nitrates, phosphates and the like, can also be used. Organic electrolytes, such as acetic and citric acids, the quaternary ammonium salts, and the like, can be used, however, due to their greater cost, are not generally preferred.

In choosing any of the above mentioned electrolytes, it must be emphasized that the electrolyte is preferably employed in acidic media to avoid the formation of phosphine ($PH_3$) or other phosphites.

As noted previously, the temperature of the phosphorus sludge during the electrolysis should be maintained above the melting point of phosphorus up to a maximum of about 65° C. in an open system; however, higher temperatures can be used in a closed system. The purpose of maintaining the electrolysis temperature above the melting point of the phosphorus is to maintain the phosphorus in a fluid state, increase the electrical conductivity, to facilitate the electrolysis and separation of the elemental phosphorus.

It also has been found that the electrolysis of the phosphorus sludge proceeds more efficiently when the sludge is contacted with a wetting agent. The wetting agent enables a reduction of the surface tension of the electrolyte and improves the reactions occurring at the electrode sites.

Any cationic, anionic or nonionic wetting agent of medium to low foaming characteristics can be used. Non-ionic ethoxylated alcohols of low to medium foaming characteristics, such as Tergitol ® 15-S9 manufactured by Union Carbide, have been found to be satisfactory. Triton ® DF 12, manufactured by Rohm and Haas, and Jefferson N-120 TM manufactured by Jefferson Chemical Co. are also suitable non-ionic wetting agents. Other suitable wetting agents can be the lineal alkyl sulfonates, alkyl benzyl sulfonates, lignosulfonates, and quaternary ammonium compounds.

The foaming properties of the wetting agents provide an additional advantage when used in open cell electrolysis systems by providing a foam layer at the surface which acts to prevent elemental phosphorus from exposure to free air and consequent oxidation. The wetting agents are preferably used in amounts which vary from about 0.01 to about 1% by weight of the phosphorus sludge. Greater amounts can be used but no advantage is derived in the electrolysis system.

The use of a closed cell to perform the electrolysis is preferred, due to the fact that it offers more flexibility in terms of varying the operating parameters, such as voltage and temperature, without the dangers that would be associated with an open cell. For example, in an open cell proper control of voltage is essential. This is due to the fact that if too high a voltage were impressed, the rise in temperature of the electrolyte sludge slurry could lead to fuming and ignition of the elemental phosphorus at the surface. This problem can be dealt with by conducting the electrolysis under an inert gas blanket, or by the use of a wetting agent capable of providing a protective foam layer over the surface of the sludge.

The method for removing elemental phosphorus from the sludge will now be described with reference to the attached FIGURE, which illustrates schematically a sequence of operation for separating phosphorus from sludge.

The phosphorus containing sludge enters a fluidized, closed electrolytic cell through Stream 1. The electrolytic cell is powered by a DC power supply, has at least two electrodes and is capable of performing fluidized electrolysis. The residence time of the phosphorus sludge in the electrolytic cell should be sufficient to enable the breaking of the emulsion so that the elemental phosphorus particles coalesce and are capable of being easily separated. The electrolytically treated phosphorus sludge and electrolyte exit the electrolytic cell through Stream 2 and enter a decanter wherein the electrolyte is decanted and returned through Stream 3 to the electrolytic cell for reuse. The returned or recycled electrolyte provides a fluidizing action in the electrolytic cell. The electrolytically treated phosphorus sludge, containing small amounts of free electrolyte, flows through Stream 4 into a filter wherein the elemental phosphorus is separated as filtrate Stream 5, and the residue sludge can be incinerated through Stream 6, or discarded, or further treated, such as by dewatering followed by return to the furnace (not shown).

Stream 5 includes filtrate consisting of elemental phosphorus and some electrolyte which is separated and can be returned to the process or treated with lime to remove excess $PO_4$ values or discarded. The residue sludge of Stream 6 can also be pelletized with phosphate ore and returned to the $P_4$ furnace (not shown) to recover additional $P_4$. The separated electrolyte, treated with lime, or untreated, can be returned to the phosphorus condenser.

In a refinement of the above described process, volatiles exit the electrolytic cell through Stream 7 and enter an incinerator. These volatiles can include oxygen, hydrocarbons, hydrogen and inert gases such as carbon dioxide or nitrogen, which can serve as a carrier gas and assist the fluidization in the electrolytic cell. The inert gases dilute the $H_2$ concentration produced from the electrolytic reaction, to safe levels. The combustible gases are burned in the incinerator. The products of combustion, along with any unburned material exit the incinerator through Stream 8 into a vented scrubber. The scrubbing material can conveniently be water, and the like, however, it is most preferably the electrolyte which can conveniently be furnished from the decanter by separating off a portion of the electrolyte recycle Stream 3 as Stream 9 which enters the scrubber. The scrubbed gases exit the scrubber through Stream 10 and can be passed through a low pressure compressor, if necessary, before reentering the electrolytic cell for purposes of providing additional fluidization. The electrolyte scrubbing medium exits the scrubber through Stream 11 where it can be returned to the electrolytic cell in a separate stream, or conveniently merged with the electrolyte recycle Stream 3. The phosphorus sludge can be retained in a phosphorus sludge holding area equipped with means for maintaining it in an evenly mixed state. This can be accomplished by stirring, agitation, and the like. The phosphorus sludge is transferred from the holding area through Stream 1 into the electrolytic cell. A portion of the electrolyte recycle Stream 3 can be directed to the phosphorus sludge holding area to facilitate the breaking up of any lumps that have formed in the sludge and also to aid in the formation of a slurry so that the sludge can be conveniently transferred to the electrolytic cell, and throughout the system.

In the examples which follow, all parts and percentages are by weight unless otherwise noted.

EXAMPLE 1

20 grams of $P_4$-sludge having the following analysis:

|  |  | Weight Percent |
|---|---|---|
| Acid insoluble | P | 0.6 |
| Acid soluble | P | 0.7 |
| Solvent soluble | P | 40.2 |
| $SiO_2$ |  | 3.4 |
| F |  | <1.0 |
| Ca |  | 1.55 |
| K |  | 1100 ppm |
| Na |  | 600 ppm | were placed in a beaker fitted with four platinized expanded titanium substrate mesh (approximately 8 mesh) electrodes. The electrodes, were 2" by 4", and were spaced ¼" apart and connected in parallel. The sludge was contacted with an aqueous electrolyte consisting of 0.7 volume percent of hydrochloric acid having a concentration of 37.5% by weight HCl, and 0.06 volume percent Tergitol ® 15-S9. The sludge mixture was mechanically stirred at room temperature while being heated to a temperature of about 60° C. A current of 6 amps DC and a cell voltage of 6 volts were applied for a period of 15 minutes. The supernatant electrolyte was allowed to settle for 5 minutes, was decanted and recycled. The settled sludge was filtered through a Seitz No. 6 pressure filter at a nitrogen pressure of 8 lbs. per square inch (psi). About 85% of the elemental phosphorus was recovered.

EXAMPLE 2

In a procedure identical to Example 1, the decanted electrolyte used with a similar sludge enabled an elemental phosphorus recovery of greater than 85%.

EXAMPLE 3

An electrolyte sludge mixture having a sludge analysis similar to Example 1 was prepared comprising 20 grams of $P_4$-sludge, 800 ml. of water, 0.5 ml. of Tergitol ® 15-S9, and 11.4 grams of $CaCl_2$. The mixture was magnetically stirred and heated to about 60° C. The current applied was 6 amps DC at a cell voltage of 10 volts. The pH at the beginning of the electrolysis was 3.5 and decreased to 1.5 after 15 minutes of electrolysis. After settling, the electrolyte was decanted and the settled sludge filtered under a nitrogen pressure of 8 psi. The recovery of white-yellow $P_4$ was more than 95%.

EXAMPLE 4

An electrolyte having the same composition as that described in Example 3 was modified by the addition of 4 grams of $CaCl_2$ and 2 grams of $Ca(OH)_2$. A current of 6 amps. was applied at a cell voltage of 10 volts. The initial pH was 10. After 15 minutes of electrolysis, the final pH was 5. After settling, decanting the electrolyte, and filtering the settled sludge, a yield of clean white $P_4$ was about 8%. The low yield of elemental $P_4$ was due primarily to the clogging of the filter. The calcium hydroxide increased the pH of the electrolyte sludge mixture, resulting in the finely divided slurry which made filtration more difficult. A filter aid, such as diatomaceous earth would assist in increasing the recovery.

EXAMPLE 5

Using the same electrolyte composition and procedure described in Example 3, 12 ml. of 36 weight percent $H_3PO_4$ were added. For a 4.5 amp DC current flow, the required cell voltage was 6 volts. After 15 minutes of electrolysis, the mixture was allowed to settle for 10-20 minutes. The electrolyte was decanted and the settled sludge filtered under a $N_2$ pressure of 8 psi. The recovery of elemental $P_4$ was more than 95%.

EXAMPLE 6

A phosphorus sludge had the following analysis:
Soluble $P_4$: 53.1%
Organics: 4%
Carbon (as Coke): 0.5%
Solids: 10%
Water and other matter: 32.4%

Five 20 gram samples of the above sludge were each placed in separate, open 600 millileter beakers. Each sample of sludge was mixed with a dilute phosphoric acid electrolyte having a different concentration of $H_3PO_4$. The concentration of the $H_3PO_4$ in the electrolyte varied from 0.4% to 40%. Tergitol ® 15-S9 wetting agent was added in an amount equivalent to 0.1% of the electrolyte. The electrolyte to sludge ratio was 20 to 1 on a weight basis. Each beaker was fitted with four platinized expanded titanium substrate mesh (approximately 8 mesh) electrodes. The electrodes, were 2" by 4", and were spaced ¼" apart and connected in parallel. Electrolysis was carried out for 15 minutes at a temperature of 55° to 65° C. at a voltage of 7 volts DC provided by an R. O. Hull and Company rectifier with a voltage range of 0 to 25 volts, equipped with an automatic timer. The electrolytically treated sludge was passed through a glass jacketed pressure filtration unit fitted with an overhead stirrer. The filtration was conducted while stirring the sludge mixture at 15 revolutions per minute (rpm), while filtering at a pressure 8 psi provided by nitrogen preheated to a temperature of 55° C. The filter paper used was Whatman grade GF-A. Results are tabulated below.

| $H_3PO_4$ Conc. in Electrolyte | Current (Amp.) | Filtration Time (Min). | $P_4$ Recovery % |
|---|---|---|---|
| 0.4% | 3 | 8 | 93% |
| 1.2% | 6 | 4 | 92% |
| 2.9% | 10 | 12 | 94% |
| 5.4% | 15 | 14 | 90% |
| 40% | 6* | 7 | 95% |

*at 4 volts

EXAMPLE 7

A sludge-electrolyte mixture was prepared having a ratio of 20 parts of electrolyte to 1 part of sludge, by weight. Each sludge sample weighed 20 grams. The electrolyte contained 1.2% phosphoric acid and 0.1% Tergitol ® 15-S9. The electrolysis was carried out at a voltage of 7 volts and a current of 6 amps at a temperature of 50°-60° C. for periods of time varying from 1 to 15 minutes. Filtration was carried out while stirring at 15 rpm. using preheated nitrogen at a temperature of 55° C. and a pressure of 8 psi. Results are tabulated

| Electrolysis (Time (Min.) | Filtration Time (Min.) | Recovery % |
|---|---|---|
| 1 | 12 | 87 |
| 3 | 5 | 89 |
| 5 | 4 | 94 |
| 7 | 5 | 90 |
| 15 | 4 | 92 |

EXAMPLE 8

Four sludge samples weighing 20 grams were each contacted with 400 milliliters of water. Each sample was then observed under different conditions in an effort to determine the most desirable approach for separating the elemental phosphorus on the basis of shortest filtration time. Results are tabulated below.

| Sample No. | Conditions | Filtration Time* |
|---|---|---|
| 1 | Heating to 55° C. maintain the Temp. for 20 min. then filter | 45 Min. |
| 2 | As Sample (1) with 0.5 ml. Tergitol ® | 15 Min. |
| 3 | 10 ml. of 40% $H_3PO_4$ 0.5 ml. Tergitol ® 3.8 V. AC 6 Amps. 30 min., 55° C. | 14 Min. |
| 4 | 10 ml. of 40% $H_3PO_4$ 0.5 ml. Tergitol ® 7V. DC. 6 amps. | 5 Min. |

| Sample No. | Conditions | Filtration Time* |
|---|---|---|
| | 15 min., 55° C. | |

*Under $N_2$ at 8–10 PSI, using 9.36 square inch filtration area, while stirring at 10 rpm.

What is claimed is:

1. A process for recovering elemental phosphorus from sludge derived from the production of elemental phosphorus by the smelting of phosphate rock which comprises subjecting said sludge to electrolysis under conditions of voltage, current and time sufficient to enable the separation of elemental phosphorus from said sludge and recovering said separated elemental phosphorus by recovery means.

2. The process of claim 1 wherein said sludge contains an electrolyte.

3. The process of claim 2 wherein said electrolyte is organic or inorganic.

4. The process of claim 3 wherein said electrolyte is an inorganic mineral acid.

5. The process of claim 4 wherein said acid is selected from the group consisting of hydrochloric, sulfuric, nitric and phosphoric.

6. The process of claim 3 wherein said electrolyte is a base selected from the group consisting of alkali and alkaline earth hydroxides.

7. The process of claim 1 wherein said electrolyte is an inorganic salt.

8. The process of claim 7 wherein said salt is selected from the group consisting of halides, sulfates, nitrates and phosphates.

9. The process of claim 2 wherein the electrolysis is conducted in acidic media.

10. The process of claim 2 wherein said electrolyte is separated from said sludge after the electrolysis but prior to the separation of the elemental phosphorus from said sludge.

11. The process of claim 1 wherein said electrolysis is conducted in an electrolytic cell provided with agitation.

12. The process of claim 11 wherein said electrolytic cell is closed.

13. The process of claim 1 wherein said elemental phosphorus is recovered from said sludge after the electrolysis by means of settling.

14. The process of claim 13 wherein said recovered electrolyte is recycled to the electrolytic cell.

15. The process of claim 1 wherein said sludge contains a wetting agent.

16. The process of claim 11 wherein said electrolytic cell contains a diaphragm.

17. The process of claim 1 wherein the electrolysis temperature is maintained above the melting point of phosphorus.

18. The process of claim 1 wherein the sludge is in a state of mechanical agitation.

19. The process of claim 1 wherein said elemental phosphorus is recovered from said sludge after the electrolysis by means of filtration.

20. The process of claim 1 wherein said elemental phosphorus is recovered from said sludge after the electrolysis by means of centrifugation.

21. The process of claim 1 wherein said electrolysis is conducted with direct current.

22. The process of claim 1 wherein said electrolysis is conducted with alternating current.

* * * * *